United States Patent [19]

Archibald

[11] Patent Number: 5,459,826
[45] Date of Patent: Oct. 17, 1995

[54] SYSTEM AND METHOD FOR PREPARING TEXT AND PICTORIAL MATERIALS FOR PRINTING USING PREDETERMINED CODING AND MERGING REGIMEN

[76] Inventor: Delbert M. Archibald, 3726 Lakeview Dr., Tallahassee, Fla. 32303

[21] Appl. No.: 529,345

[22] Filed: May 25, 1990

[51] Int. Cl.$^6$ ..................................................... G06T 11/60
[52] U.S. Cl. ........................... 395/147; 395/135; 395/145; 395/148
[58] Field of Search ..................................... 395/131–136, 395/145–149, 164; 364/DIG. 2; 380/49, 80

[56]  References Cited

U.S. PATENT DOCUMENTS

| | | | |
|---|---|---|---|
| 3,976,982 | 8/1976 | Eiselen | 395/136 X |
| 4,513,442 | 4/1985 | Scherl | 382/49 |
| 4,539,653 | 9/1985 | Bartlett et al. | 364/DIG. 2 |
| 4,581,710 | 4/1986 | Hasselmeier | 395/164 |
| 4,792,847 | 12/1988 | Shimazaki et al. | 382/80 |
| 4,918,622 | 4/1990 | Granger et al. | 395/132 |
| 5,025,396 | 6/1991 | Parks et al. | 395/147 |
| 5,029,115 | 7/1991 | Geraci | 395/131 |
| 5,050,099 | 9/1991 | Nishihara | 395/109 |
| 5,051,930 | 9/1991 | Kuwabara et al. | 395/145 X |

Primary Examiner—Almis R. Jankus
Attorney, Agent, or Firm—Allen, Dyer, Doppelt, Franjola & Milbrath

[57]  ABSTRACT

A method and system for locally organizing and laying out text and pictorial material for a page to be printed at a remote facility provides a layout template having a fixed grid pattern, and plural layout elements which are organized across the grid pattern corresponding to the page to be printed. Each element contains an area for text or pictorial material. A predetermined code is assigned to each layout element, with regard to whether the element contains text, photographs, or both. A predetermined code is assigned to each layout element and represents the area of the element with respect to the grid pattern of the template. A representation of the organized layout elements is generated and transmitted to the remote facility, where the pictorial and text elements are correlated and merged together to provide an output data stream representative of the page to be printed.

24 Claims, 7 Drawing Sheets

| ADVERTISER NAMES 17 | PRINT ON PAGE 19 |

| M24-IL | |
| MUG POS. 2A | |
| NAME Title Achievements | TEXT POS. |

| | TEXT POS. |
| M24-2 MUG POS. 3F | PHOTO NAME Title Achievem'ts | M24-2 MUG POS. 4A |
| | PHOTO NAME Title Achievem'ts |

26-4 OR 36-6

PHOTO POSITION 2D

THIS IS YOUR CAPTION

| 25-2 | 25-1 |
| | PHOTO POSITION 3A |
| PHOTO POSITION 2C | 25-1 |
| | PHOTO POSITION 3B |
| THIS IS YOUR CAPTION | THIS IS YOUR CAPTION |

| AD STYLE 4-☐ (ABE) | FULL SIZE AD ONLY | Mag.# 1207 | Vol./Issue IV/6 | Page 2 |
| | BLEED CHARGES APPLY | Print this ad: | Pick up ad from: IV/5 | 2 |
| | New Photos 3 | Build like ad: | |
| | Pick up Photos 2 | | Advertiser's |
| | Total Photos 7 | Vol./Issue | Page/Loc. | Name/Title |
| LOGOS- FL logo# | Custom logo: ☐New ☐Pickup | | | |
| HEADER- Catalog# | ☐Rows ☐Width / Style | | | |
| ASSN.LOGOS- Assn.logo#1 | Assn. Logo #2 | | | |
| HEADER TYPE- Catalog# | | | | |
| AD BORDER- Catalog# | Width: | ☐Style A ☐No Border | | |
| MUGS- Border Catalog# | | | | |
| COLOR- Bleed Color# | ☐See Special Design Service Order Form | | | |

SYSTEM AND METHOD FOR PREPARING TEXT AND PICTORIAL MATERIALS FOR PRINTING USING PREDETERMINED CODING AND MERGING REGIMEN

BACKGROUND OF THE INVENTION

1. Field of the Invention

The present invention relates to systems and methods for preparing text and pictorial materials for printing.

2. Description of the Prior Art

The business of printing can be generally broken down into two basic functions: the so called "pre-press" function, in which the text and pictorial materials are prepared in a format acceptable to the printing press; and the step of actually printing the output of the pre-press step.

Traditionally, the pre-press part of printing has been very labor intensive and uses large quantities of paper, film, art supplies and other materials. This step also demands careful manual proofing for errors. In recent years, the labor intensity of the pre-press function has been reduced significantly through the development of so called "desk top" publishing techniques associated with automated data processing systems. Further, there have been developed automated data processing and image scanning systems for preparing a data output representative of the pictorial elements to be printed with the text materials. There have been a number of suggestions for merging the pictorial/graphic elements with the text output of a desk top publishing system, but prior art solutions have required extremely expensive work stations and very skilled manual labor.

SUMMARY OF THE INVENTION

The present invention is a system and method for preparing for printing a page containing both text and pictorial elements (i.e., such as photographs, graphs and the like). The system and method of the present invention has particular utility for locally organizing and laying out the text and pictorial material and then transmitting representations of both the text and pictorial material to a remote printing facility.

In accordance with the system and method of the present invention, the text to be printed is laid out corresponding to the page to be printed. In one embodiment, this is achieved by providing a layout template having a fixed grid pattern, and further providing plural layout elements organized across the grid pattern in a manner corresponding to the page to be printed, each element containing an area for text or pictorial elements or both. Each layout element is assigned a predetermined code representative of the area of the element relative to the area of the grid pattern on the layout template. The layout template may be a printed work sheet and the layout elements may be "puzzle pieces" which may be organized together across the work sheet; alternatively, the grid pattern of the layout template and the layout elements may be electronically organized for presentation on a conventional cathode ray tube display in connection with a personal computer or work station. The layout template may also be provided with an associated information input relating to the page to be printed at the remote location; in a manual embodiment, the information input comprises a separate strip along the bottom of the work sheet which provides an information input for use at the remote printing facility.

The pictorial elements to appear on the page to be printed at the remote facility are locally prepared. By way of example, the pictorial elements may constitute photographic images, graphs, charts, etc. Each pictorial element is identified with a specific layout element in the grid pattern where the pictorial element is to appear on the printed page, but is transmitted separately to the remote printing facility.

Either at the local site or at the remote printing facility (or both), a first data stream is prepared representative of the text appearing on all of the layout elements across the page to be printed, with reference to the coding inputs representative of that particular page, as well as the information input. The pictorial elements are sized with reference to the coding of the layout element in the area in which the pictorial material is to appear, and all of the pictorial elements associated with the particular page under consideration are passed through an image scanner which provides a second data stream. The first and second data streams are then correlated and merged to provide an output data stream representative of the text and pictorial materials and in such a manner as to indicate the size and arrangement corresponding to the page to be printed. When the pictorial material is to be in color, the output data stream also contains color separation information which is an exact registry with each other color and with the text of the page to be printed.

DETAILED DESCRIPTION

A detailed discussion of the system and method of the present invention is set forth below with reference to FIGS. 1–6, in which common reference numerals among the several figures refer to the same elements.

Figure 1:
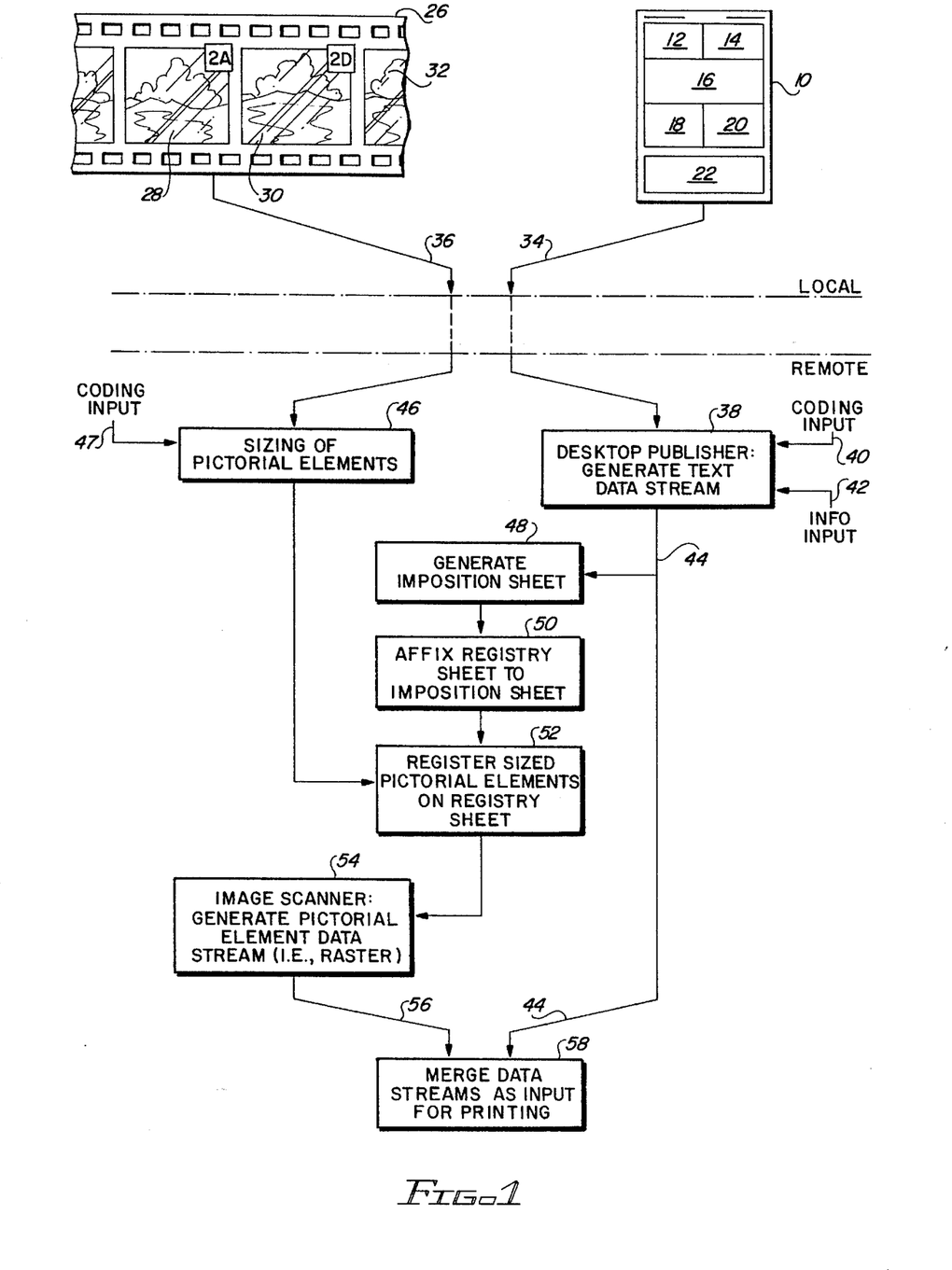
FIG. 1 is a pictorial representation, partially in block diagram form, of the system of the present invention.

FIG. 1 is a system diagram and flow chart illustrating the various steps that are conducted in the method of the present invention.

As discussed above, the system and method of the present invention has particular utility in connection with the preparation for printing of material which is generated at a local area, but which is to be printed at a remote facility. To this end, FIG. 1 separates the "local" area from the "remote" facility, so as to indicate that the text and pictorial elements prepared in the local area are transmitted to the remote facility. Such transmission can be by hard copy, or through electronic data transmission techniques.

As shown in FIG. 1, there is provided a layout template 10 having layout elements 12, 14, 16, 18 and 20 organized across the template. The specific format of the template 10 and the layout elements 12, 14, 16, 18 and 20 (as well as other non-selected layout elements 101–109) will be described in greater detail below with reference to FIGS. 2–5. The template 10 also includes an information strip 22, which likewise will be described in further detail below. It will be noted that the layout elements 12, 14, 16, 18 and 20 form a pattern which corresponds to a single page which is to be printed, and which will have associated pictorial elements at the time of printing. However, the pictorial elements are not associated with the layout elements 12, 14, 16, 18 and 20 until the preprinting activity at the remote facility.

Figure 2:
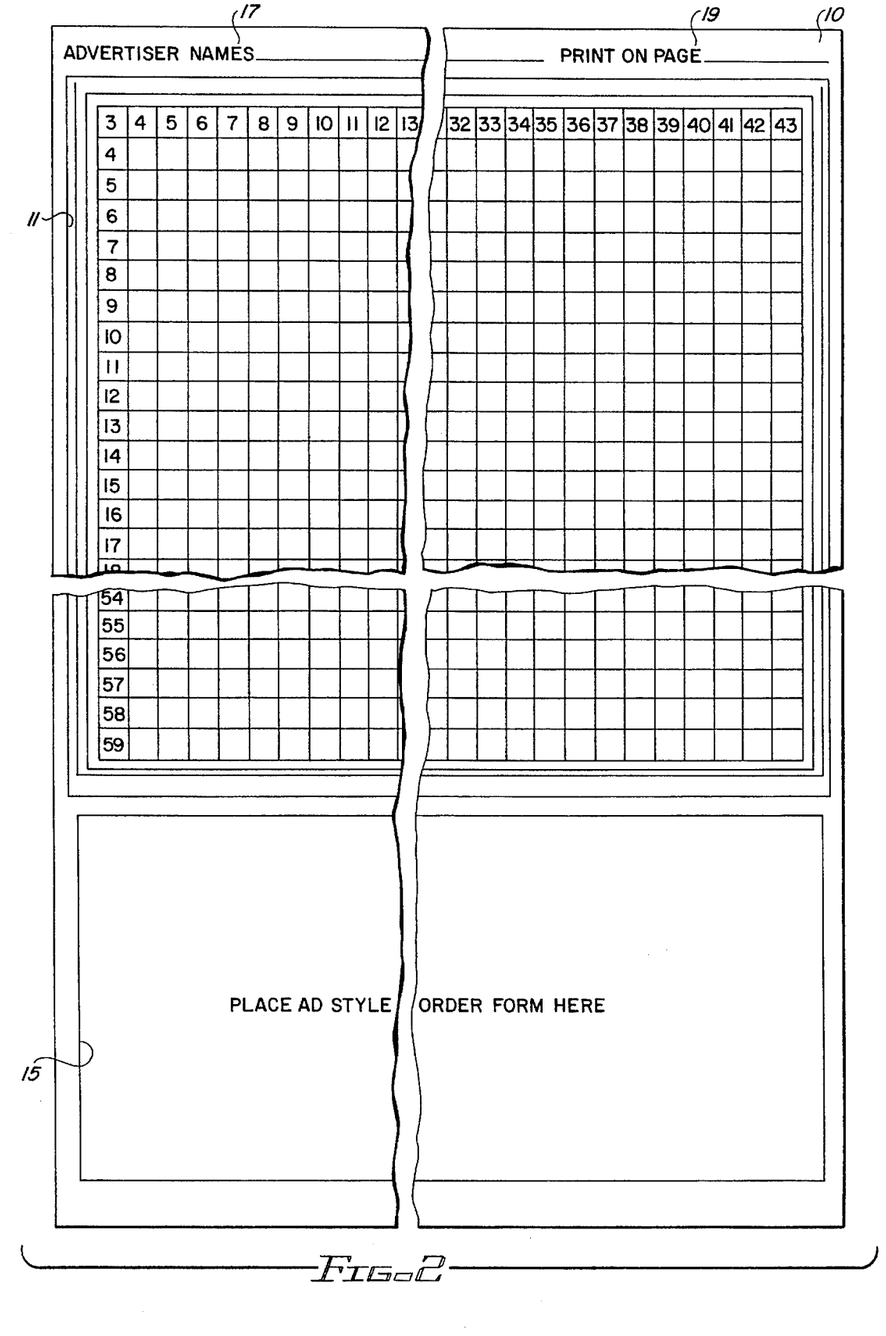
FIG. 2 is a top plan view of a layout template in accordance with the present invention.

Details of the layout template 10 are shown in FIG. 2. The template 10 includes a raised border so as to form a recess 11 in the center of the field which corresponds to the page to be printed. A vertical-horizontal grid pattern 13 is printed within the field defined by the recess 11. A second recess 15 across the bottom of the template 10 provides a location for inserting the information strip 22 (or any other non-selected information strip, such as strips 107, 108 or 109).

Figure 3:
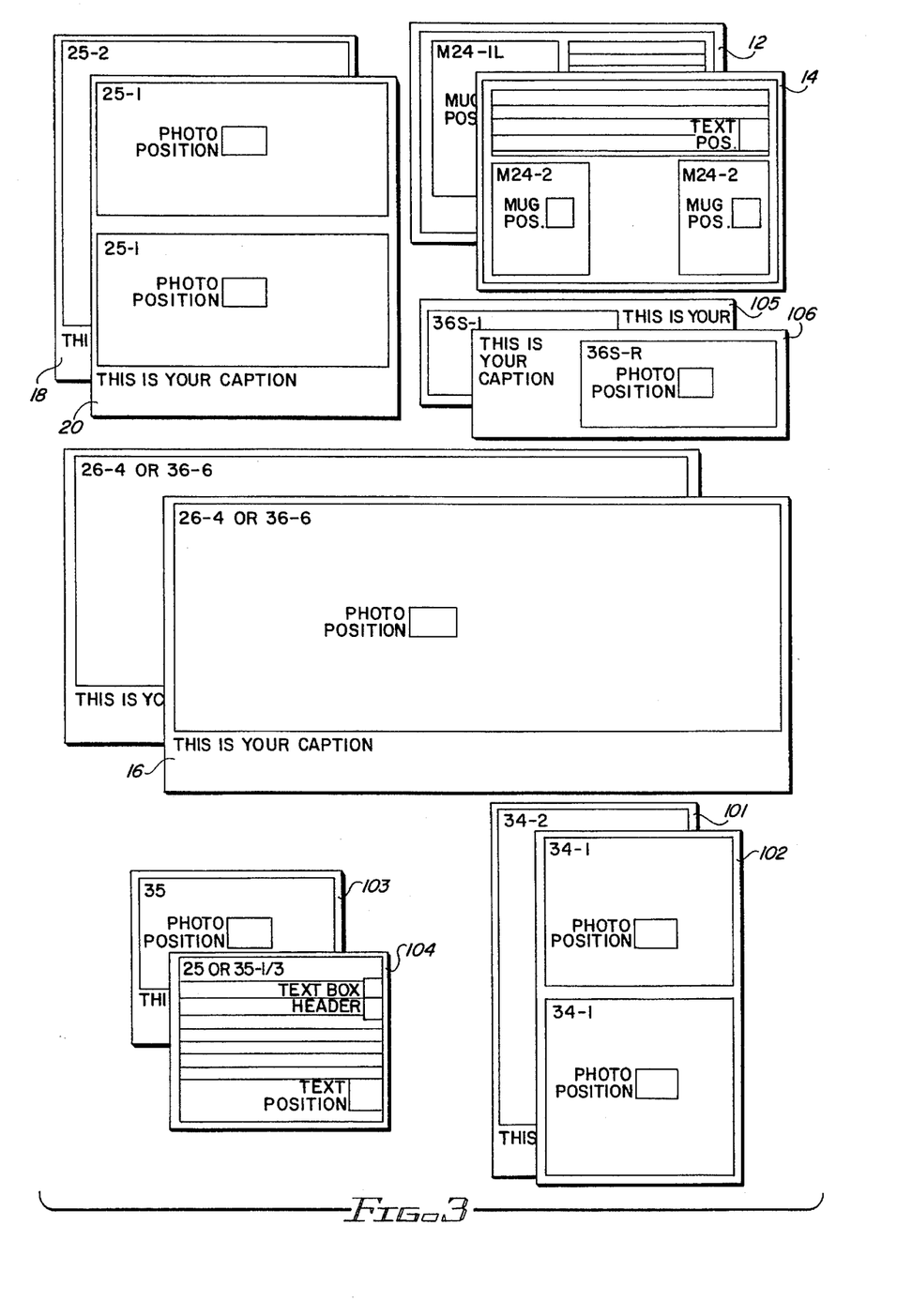
FIG. 3 illustrates a number of plural layout elements in accordance with the present invention.

FIG. 3 illustrates representative samples of the plural layout elements that may be utilized with the template 10 in order to organize and layout at the local area the page to be printed. By way of example, FIG. 3 includes the selected layout elements 12, 14, 16, 18 and 20 as well as non-selected layout elements 101, 102, 103, 104, 105 and 106. Each layout element is provided with a predetermined code that indicates the nature of the material associated with that layout element. For example, layout element 12 is provided with the code "M24-1L" which, in the particular context in which this element is used, represents a "mug" photograph (i.e., a head shot) and in which the size of the layout element is such that two will fit horizontally across the grid pattern. Similarly, layout element 16 is provided with the code 26-4 or 36-6, indicating that a photo layout element having the area of four elements that may fit two across and six down on a page, or an area of six fitting three across and six down. Layout elements 18 and 20 have respective codes 25-2 and 25-1 indicating the particular photo layout. Non-selected layout elements 101 and 102 are provided with codes 34-2 and 34-1, respectively, indicating the particular photo layout. Non-selected layout elements 103 and 104 are respectively provided with codes 35 and 25/35, respectively, indicating that a photo layout element that may fit three across and five down. It is noteworthy that layout element 104 contains space for text only, without any graphic element. It will thus be understood that the layout elements need not include pictorial material on every layout element, and likewise there need not be text associated with every layout element.

Figure 4:
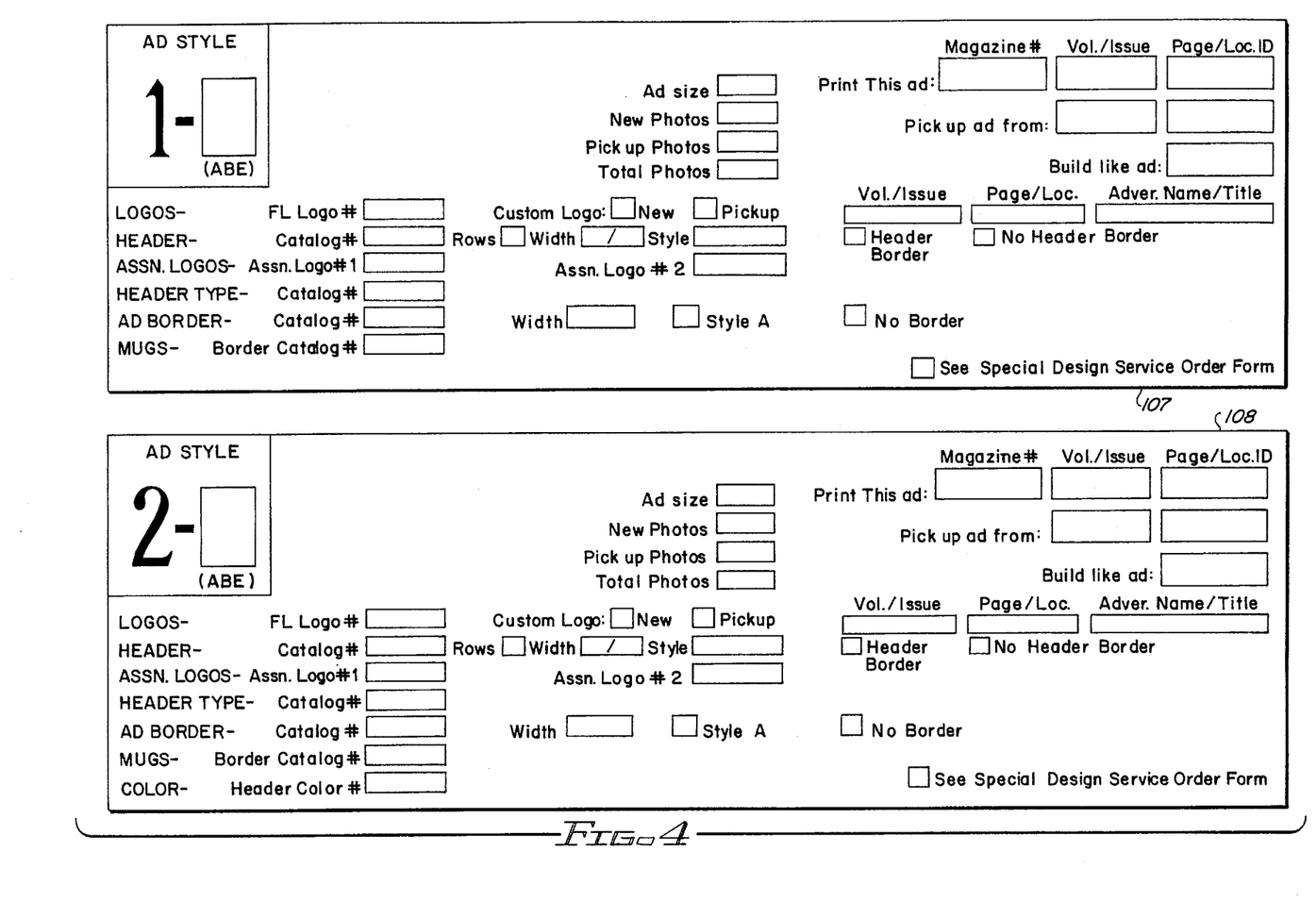
FIG. 4 is a top plan view of a number of information input strips used with the system of the present invention.
Figure 5:
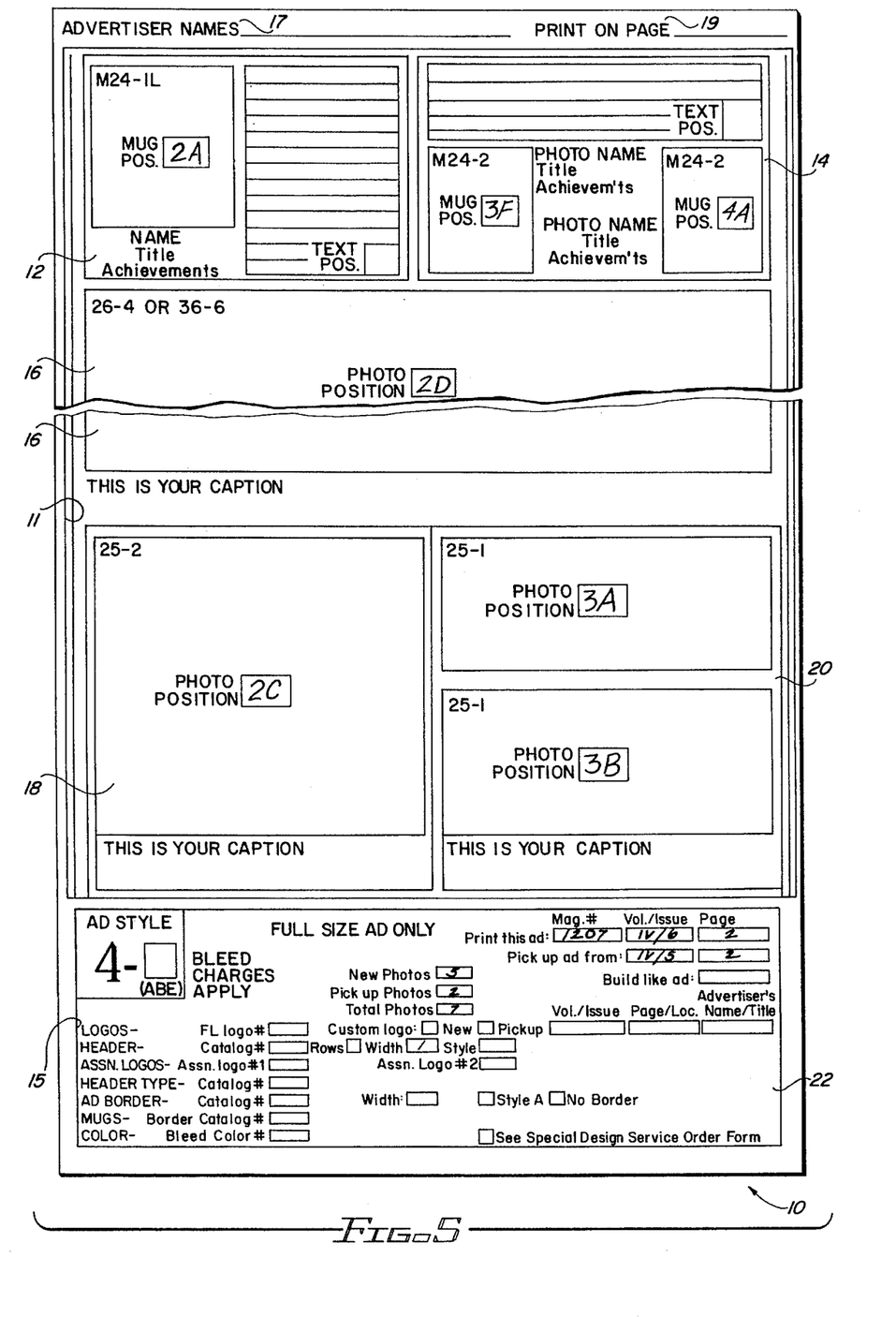
FIG. 5 is a top plan view illustrating the layout template of the present invention with plural layout elements organized across the grid pattern, and with an information input strip positioned across the bottom of the template.

FIG. 4 illustrates the selected information strip 22, as well as other, non-selected information strips 107, 108 and 109. Again, each information strip is provided with coding information to assist with the input at the remote facility at the time of the generation of both the text data stream 44 and the sizing of the pictorial elements at 46.

It will thus be understood that the layout elements and information strips shown in FIGS. 3 and 4 are somewhat akin to puzzle pieces, but which may be out together to form a number of different layout configurations for each page to be printed. It will of course be understood that the layout elements information strips shown in FIGS. 3 and 4 are representative only, and that a wide variety of such elements may be created, so long as each is provided with its own identifiable code, and that coding input is recognizable by the desk top publishing system which generates the text data stream 44 and the imposition sheet 49.

The pictorial elements may include, for example, photographic images such as those set forth on a 35 mm film strip 26, including photographic images 28, 30 and 32. Each of the images is provided with a coding ("2A", "2D" etc.) the purposes of which will be described below. The image of the template 10 (for example, a photocopy or an electronic data transmission) is sent via 34 to the remote printing facility, as is the film strip 26 via path 36.

Upon receipt at the remote facility, the text for all of the layout elements 12, 14, 16, 18 and 20 are inputted into a desk top publishing system at 38 in order to generate a text data stream 44. In addition to the text associated with each of the layout elements 12, 14, 16, 18 and 20, the coding for each of the layout elements is provided as an input 40 to the desk top publishing system. Likewise, the information contained on strip 22 is provided as an information input 42 to that data processing system. The resulting data stream 44 thus images the location, size, text and pictorial material position for each of the layout elements 12, 14, 16, 18 and 20. The text data stream 44 is then provided as an input to generate an imposition sheet (again, either as a hard copy or electronically) and also provided as a final input to a merger system 58.

Upon generation of the imposition sheet at 48, a registry sheet is then affixed to the imposition sheet at 50. The pictorial elements received at the printing facility (e.g., photographs 28, 30 and 32 in filmstrip 26) are then sized in accordance with a coding input 47 which corresponds to the coding input 40. Once the pictorial elements are sized at 46, then they are registered on the registry sheet which has in turn been affixed to the imposition sheet, as described next with reference to FIG. 6.

Figure 6:
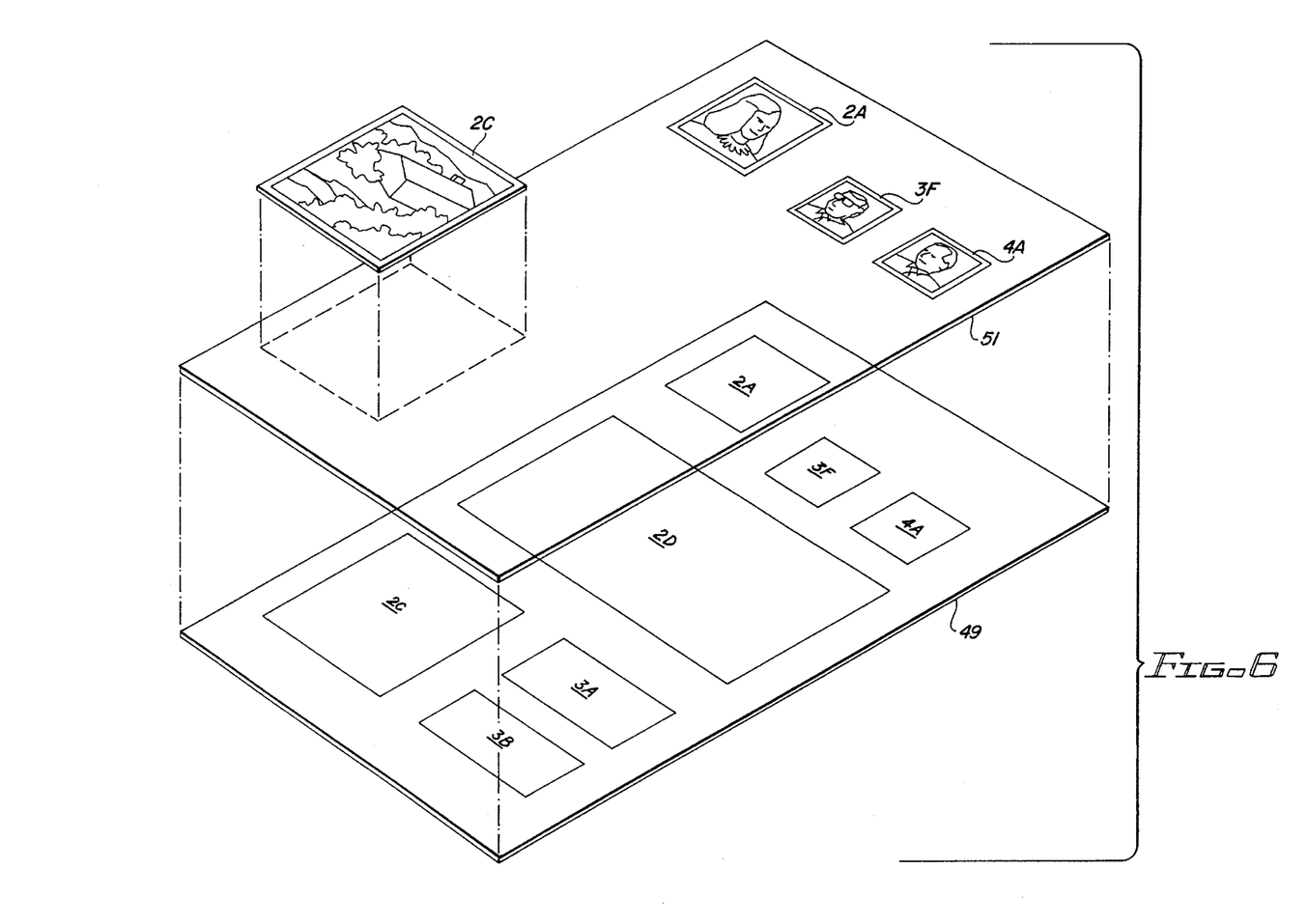
FIG. 6 is a perspective, exploded view of the imposition sheet and registry sheet, illustrating the manner in which the pictorial material is registered on the registry sheet.

Noting FIG. 6, the imposition sheet 49 constitutes an output of the text data stream 44, and contains the layout for all of the photographs to appear on the page to be printed corresponding to the template 10. The registry sheet 51 comprises a clear sheet which is affixed over the imposition sheet 49. Thereafter, each sized photograph as an output of step 46 is affixed over the corresponding field of that photograph, as determined by the imposition sheet 49; three of the photographs 2A, 3F, and 4A are shown affixed to the imposition sheet 51, while a fourth photograph 2C is shown in the process of being registered over the corresponding field, as determined by the imposition sheet 49. It will be understood from a review of FIG. 5 that additional photographs 2A, 3A and 3B are also to be registered to the registry sheet 51 before conducting the next step.

As shown at 54, the registry sheet 51 is then removed from the imposition sheet and passed through an image scanner to generate a pictorial element data stream in the form of a raster scan which can be utilized to print the page corresponding to the combined elements of the film strip 26 and the layout elements 12, 14, 16, 18 and 20 on the template 10. Because the pictorial elements have been previously sized at 46 and properly registered at 52, then the raster output 56 from step 54 contains all of the required color separation data for any color photographs or other color graphic or pictorial elements which are to appear upon the page to be printed.

The raster data stream 56 and the text data stream 44 are then merged to form an input for printing at 58.

The various components of the system of the present invention used at the remote facility are well known in the publishing field. For example, a suitable desk top publisher for generating the text data stream is a network of McIntosh personal computers which have been programmed to receive and recognize the coding inputs 40 and 42; suitable desk-top publishing software includes the Scriptor/PS. The input scanner system suitably comprises a Crosfield Magna Scan 636 input scanner, interfaced with a Crosfield Magna Scan 646 Expose (output) scanner; these two systems are also referred to as the Crosfield 636 WISS and 646 WMSS, respectively. Crosfield scanning systems may also be supported by a "Magnet" support system, which provides networking, image buffer storage and monitoring. Other software support for the system includes a PC based POSTSCRIPT-compatible raster image processor, and appropriate networking software.

It will be appreciated by those skilled in the art that the system and method of the present invention thus provides an efficient and facile technique for significantly reducing the amount of labor required in the pre-press processing of both text and pictorial materials which are to be printed by using a regimen which recognizes predetermined coding inputs which place the text and pictorial elements in a proper layout position with respect to a coordinate specification made at the very beginning of the layout process. The system has particular utility for the printing of advertising copy containing color photographs, such as catalogs, real estate listing magazines and similar printed materials.

I claim:

1. A method for preparing for printing a page containing both text and pictorial images, the method comprising the steps of:

laying out the text to be printed in a text pattern which corresponds to a desired text pattern of the page to be printed;

generating a text data stream representative of the text pattern;

laying out the pictorial images in a selected pattern which corresponds to a desired pattern of the images on the page to be printed;

passing all of the pictorial images in the selected pattern through a scanner and generating a data stream representative of all the pictorial images in the selected pattern; and correlating and merging the text and pictorial data streams to provide an output data stream representative of the page to be printed.

2. The method for preparing a page for printing as recited in claim 1 further comprising the step of sizing each pictorial image to correspond to a desired size of each pictorial image in the desired pattern.

3. The method recited in claim 1 wherein the pictorial images are in color, further comprising the step of generating color separation data with the pictorial image data stream.

4. A method for preparing for printing a page containing both text and pictorial images, the method comprising the steps of:

providing a plurality of layout elements, each element having a predetermined layout patterns;

arranging text and pictorial images with each layout element;

organizing the layout elements in a selected pattern corresponding to a desired pattern of the page to be printed;

generating a first data stream representing the text of all of the layout elements;

generating a second data stream representing all of the pictorial images associated with all of the layout elements; and correlating and merging the first and second data streams to provide an output data stream representing the text and pictorial images sized and arranged corresponding the a desired size and pattern of the page to be printed.

5. A method for preparing for printing a page containing both text and pictorial images, the method comprising of:

providing a plurality of layout elements, each element having a predetermined layout patterns;

arranging text and pictorial images with each layout element;

organizing the layout elements in a selected pattern corresponding to a desired pattern of the page to be printed;

generating a first data stream representing the text of all of the layout elements;

generating a second data stream representing all of the pictorial images associated with all of the layout elements;

correlating and merging the first and second data streams to provide an output data stream representing the text and pictorial images sized and arranged corresponding to a desired size and pattern of the page to be printed; and providing each layout element with a code.

6. The method recited in claim 5 further comprising the step of selecting the code in a manner which identifies a desired sizing of any pictorial images associated with each layout element.

7. The method recited in claim 6 further comprising the step of providing a coding input representative of all of the layout elements, and correlating the first data stream responsive to that coding input.

8. The method recited in claim 5 further comprising the step of selecting the code in a manner which identifies text elements of the page to be printed.

9. The method recited in claim 8 further comprising the step of correlating the first data stream responsive to a coding input representative of the text elements.

10. A method for organizing and laying out text and pictorial material for a page to be printed, comprising the steps of:

providing a layout template having a fixed grid pattern and an area within the grid pattern;

organizing plural layout elements across the grid pattern in an organization corresponding to an organization for the page to be printed, each element containing an area for text or pictorial material, or both; and assigning a predetermined code to each layout element, each code representative of the area of the element relative to the area of the grid pattern of the layout template.

11. The method recited in claim 10 further comprising the step of assigning the predetermined codes so as to represent a relationship of text and pictorial material where both appear on the same layout element.

12. The method recited in claim 10 further comprising the step of affixing with the layout template an information input containing information relating to the page to be printed.

13. A for organizing and laying out text and pictorial material for a page to be printed, comprising the steps of:

providing a layout template having a fixed grid pattern and an area within the grid pattern;

organizing plural layout elements across the grid pattern in an organization corresponding to an organization for the page to be printed, each element containing an area for text or pictorial material, or both;

assigning a predetermined code to each layout element, each code representative of the area of the element relative to the area of the grid pattern of the layout template; and generating a representation of the organized layout elements.

14. The method recited in claim 13 further comprising the steps of:

preparing representations of the pictorial materials to appear on the page to be printed; and sizing each pictorial representation with reference to the code assigned to the layout element in the area where the pictorial material is to appear.

15. The method recited in claim 14 further comprising the step of registering the sized pictorial representations for the page to be printed with the corresponding layout elements.

16. The method recited in claim 15 further comprising the steps of:

passing the registered pictorial representations through an image scanner; and generating a data stream representative of the pictorial materials to appear on the printed page.

17. The method recited in claim 15 wherein the generated representations of the organized layout elements comprises an imposition sheet and wherein the registering step comprises the steps of:

placing a transparent registry sheet over the imposition sheet; and registering the sized pictorial representations on the transparent registry sheet within a corresponding area of the imposition sheet.

18. A method for locally organizing and laying out text and pictorial material for a page to be printed at a remote facility, the method comprising the steps of:

providing a layout template having a fixed grid pattern;

organizing plural layout elements across the fixed grid pattern in an organization corresponding to the organization of a page to be printed, each element containing an area for text or pictorial material, or both;

assigning a predetermined code to each layout element, each code representative of the area of the element relative to an area of the grid pattern on the layout template;

generating a representation of the organized layout elements;

transmitting the representation of the organized layout elements to the remote facility where the page is to be printed; and generating and transmitting with the representation of the organized layout elements an information input relating to the page to be printed at the remote location.

19. The method recited in claim 18 further comprising the steps of:

preparing representations of the pictorial material to appear on the printed page at a local facility separate from the remote facility;

at the local facility, assigning a designation to each pictorial material representation, each designation corresponding to one of the layout elements; and transmitting the pictorial representations from the local facility to the remote facility.

20. The method recited in claim 19 further comprising, at the remote facility, the step of sizing each pictorial representation with reference to the corresponding designation.

21. The method recited in claim 20 further comprising the step of registering the sized pictorial representations with an image representative of the corresponding layout elements.

22. The method recited in claim 21 further comprising the steps of:

passing the sized and registered pictorial representations through an image scanner; and generating a raster data stream representative of the pictorial materials to appear on the printed page.

23. A system for preparing and printing a page containing both a text pattern and pictorial images, comprising:

means for laying out the text to be printed in a pattern corresponding to a desired pattern for the page to be printed;

means for generating a text data stream corresponding to the text pattern;

means for laying out the pictorial images in a pictorial pattern with each location in the pictorial pattern corresponding to a desired location of the image on the page to be printed;

an image scanner for receiving the pictorial images and generating a data stream representative of all of the images in the pattern;

means for correlating and merging the text and pictorial data streams to provide an output data stream representative of the page to be printed;

a layout template having a fixed grid pattern and an area within the grid pattern; and plural layout elements dimensioned to be organized across the grid pattern in an organization corresponding to the page to be printed, each element containing an area for text or pictorial material or both.

24. The system recited in claim 23 further comprising a predetermined code affixed to each layout element, each code representative of the area of the element relative to the area of the layout template.

* * * * *